United States Patent [19]

Miyao et al.

[11] Patent Number: 5,691,058
[45] Date of Patent: Nov. 25, 1997

[54] SHEET MATERIAL FOR ELECTRICAL INSULATION, PREPREG AND ELECTRICALLY INSULATED COIL USING THE SAME

[75] Inventors: Hiroshi Miyao, Hitachinaka; Yutaka Higashimura, Hitachi; Makoto Takamura, Hitachi; Takanori Satoo, Hitachi; Hiroyuki Kamiya, Hitachi; Mitsuru Onoda, Hitachi, all of Japan

[73] Assignee: Hitachi, Ltd., Tokyo, Japan

[21] Appl. No.: 370,197

[22] Filed: Jan. 9, 1995

[30] Foreign Application Priority Data

Jan. 11, 1994 [JP] Japan .................................. 6-001092

[51] Int. Cl.$^6$ .................................................. B32B 15/02
[52] U.S. Cl. .......................... 428/379; 428/377; 336/182; 336/223
[58] Field of Search ............................. 428/379, 377; 336/182, 223; 310/196

[56] References Cited

U.S. PATENT DOCUMENTS

| 3,633,140 | 1/1972 | Lake et al. ........................ 336/182 |
| 3,723,797 | 3/1973 | Andersson et al. ................. 310/196 |

FOREIGN PATENT DOCUMENTS

| 972678 | 7/1949 | Germany . |
| 1005613 | 7/1955 | Germany . |
| 48-4851 | 2/1973 | Japan . |
| 2-59452 | 2/1990 | Japan . |
| 607412 | 12/1977 | Switzerland . |
| 1342425 | 5/1971 | United Kingdom . |

OTHER PUBLICATIONS

"Glass–Flake Paper—A New Electrical Insulation Material", Conklin et al, Electrical Manufacturing, Jun. 1958, pp. 87–91.

*Primary Examiner*—Kathleen Choi
*Attorney, Agent, or Firm*—Fay, Sharpe, Beall, Fagan, Minnich & McKee

[57] ABSTRACT

An electrically insulated coil, characterized in that an electrical insulation layer wound around an electrical conductor is formed by laminating layers of glass flakes having a thickness of 0.2–1 μm and a diameter of 40–250 μm on a backing member of a sheet-like electrical insulation material and by impregnating with a semi-cured thermosetting resin. An electrically insulated coil is provided, having an excellent partial discharge resistance as well as having a high dielectric break down strength even when subjected to a large mechanical distortion.

8 Claims, 3 Drawing Sheets

SHEET MATERIAL FOR ELECTRICAL INSULATION, PREPREG AND ELECTRICALLY INSULATED COIL USING THE SAME

BACKGROUND OF THE INVENTION

1. Field of the Induatrial Application

The present invention relates to a sheet material and a prepreg for electrical insulation, and, more specifically, relates to a sheet material and a prepreg for electrical insulation suitable for an electrically insulated coil to be used for a high voltage electrical machine which requires, in particular, a high mechanical strength, and to an electrically insulated coil using the same.

2. Related Art

Electrically insulated coils for conventional electrical machines (for example, dynamoelectric machines) are produced either with a dry electrical insulation tape constituted by a glass cloth and a laminated mica or flake mica by winding the same around a coil conductor, impregnating a thermosetting resin thereinto and thereafter by forming, heating and curing the tape, or with a semi-cured prepreg tape formed by impregnating in advance a thermosetting resin into the electrical insulation tape by winding the same around a coil conductor, forming the same and thereafter heating and fully curing the same.

The dielectric strengths of the above explained conventional electrically insulated coils are designed to be primarily shared by the laminated mica, and the mechanical strengths of the coils are designed to be primarily shared by the flake mica or the glass cloth.

However, the flake mica has a drawback that both the dielectric resistance and mechanical strength are comparatively low, and the glass cloth has a drawback that the dielectric resistance is low because of no barrier effect against an electric discharge streamer. Therefore there has been a problem that even the composite structure thereof with the laminated mica having a low mechanical strength cannot provide a sufficient dielectric resistance.

As a measure for improving the above indicated mechanical strength, a glass flake sheet is known as, for example, disclosed in JP(U)-B-48-4851(1973). The glass flake sheet is formed like a paper making by using scale like pieces prepared by pulverizing a thin glass and a backing member such as a glass cloth so that the thus formed glass flake sheet shows a better mechanical strength than the laminated mica sheet formed in a like manner.

However, the conventional glass flakes are ones of glass film prepared by inflation processings wherein molten glass is inflated into a large ball and cooled, and thereafter pulverized into flakes of glass film. Therefore, the size of the flakes is large, in that the thickness thereof is more than 5 μm and the diameter thereof is about 400 μm. Further, the mutual adhesion of the flakes when laminated is insufficient possibly because of the spherical surface configuration of the respective flakes. Therefore, a sufficient barrier effect of the flakes as indicated above cannot be obtained, which has produced drawbacks of poor partial discharge resistance of the electrical insulation sheet.

SUMMARY OF THE INVENTION

A first object of the present invention is to provide a sheet material and a prepreg for electrical insulation using glass flakes having a higher dielectric resistance and partial discharge resistance than those of the conventional sheet material and prepreg.

A second object of the present invention is to provide an electrically insulated coil using the above sheet material or the prepreg for electrical insulation.

A third object of the present invention is to provide an electrical machine using the electrically insulated coil which is formed by the above sheet material or the prepreg for electrical insulation.

The essences of the present invention which resolve the above problems are as follows.

(1) The sheet material for electrical insulation is formed by laminating layers of glass flakes having a thickness of 0.2–1 μm and a diameter of 40–250 μm on a backing member of a sheet-like electrical insulation material.

(2) The prepreg for electrical insulation is formed by laminating layers of glass flakes having a thickness of 0.2–1 μm and a diameter of 40–250 μm on a backing member of a sheet like electrical insulation material and by impregnating with a semi-cured thermosetting resin.

(3) The electrically insulated coil is an electrical conductor around which is wound an electrical insulation layer formed by laminating layers of glass flakes having a thickness of 0.2–1 μm and a diameter of 40–250 μm on a backing member of a sheet-like electrical insulation material and by impregnating with a semi-cured thermosetting resin.

(4) The glass flakes are prepared by sol-gel processings.

A feature of the present invention is the use of glass flakes having a thickness of 0.2–1 μm and a the diameter of 40–250 μm which show a high mechanical strength and an excellent dielectric resistance in comparison with the conventional flakes. These glass flakes are, for example, prepared by pulverizing glass films produced by sol-gel processings.

By making use of the electrical insulation sheet material using the glass flakes according to the present invention, a manufacture of electrically insulated coils having a high voltage withstanding property as well as an excellent mechanical strength is realized.

In sol-gel processings referred to above, a metal alkoxide represented by the following chemical formula (1) is used as a raw material:

$$M(OR)n \qquad (1)$$

wherein M stands for a metal atom having n-valent and R a low alkyl group. With addition of water to the raw material, a colloidal solution is produced through hydorolysis and the subsequent condensation reaction, and thereafter a sol-gel tranfer is caused. The thus obtained raw material in gel state and wet condition is formed on a flat plate and dried, and thereafter is sintered by gradually heating at a predetermined temperature, for example, in the case of silicon alkoxide at a temperature of 500°–1000° C.

Si, Al, Ti and Ta can be used for the metal M in the above chemical formula, however Si is preferable for the metal M. When silicon alkoxide is used which is determined by selecting Si for the metal M, $SiO_2$ glass flakes having high purity can be obtained in comparison with conventional flakes.

The sol-gel processings as referred to above include the following features, in that, a glass having a pure composition can be obtained, a large freedom is permitted for determining the shape of the glass film formed and the glass having film thickness on the order of submicrons can be freely manufactured. In particular, with the sol-gel processings, glass flakes having a thin film thickness, a small diameter and a flat shape can be manufactured which could not be manufactured with the conventional inflation processings.

An example of such glass flakes manufactured by the sol-gel processings is SG glass flakes (product of Nihon Plate Glass Manufacturing Company).

The electrical insulation sheet material is manufactured by dispersing the above glass flakes in the same manner as paper making on a backing member of glass cloth. Further, when the thus manufactured electrical insulation sheet is impregnated by a thermosetting resin diluted by a solvent, for example, and then the solvent is dried and thereafter heated at a predetermined temperature to render the impregnated resin into a semi-cured state (to render into B-stage), a glass flake prepreg is obtained.

The type of the resin to be impregnated is not limited if such can be used for manufacturing such as the ordinary glass prepregs, however, resins of epoxy series are preferable in view of their dielectric properties and heat resistances. Further, any solvents can be used if such can dissolve a sufficient amount of resin to be impregnated.

A glass cloth is most common as the backing member for the above glass flake prepreg, however, woven or non woven fabrics of such as liquid crystal polymer, for example alamide, and polyester can be used depending on application purposes.

Further, since the glass flakes exhibit a high tensile rupture distortion in comparison with mica flakes, therefore when these glass flakes are laminated like the laminated mica, a sheet-like electrical insulation material having a high mechanical strength can be obtained. For manufacturing such an electrical insulation sheet, glass flakes having a thickness of 0.2–1 μm and the diameter (the size of the flake) of 40–250 μm are preferable.

The glass flakes exhibit a high dielectric resistance and a good partial discharge resistance. It is not necessarily clear why the electrical insulation sheet and prepreg using the glass flakes according to the present invention show superior properties with regard to the above resistances, however, since the thickness of the glass flakes is in the order of submicrons, the diameter (the size of the flake) is as small as below 250 μm and the layer formed by laminating the glass flakes is dense, it is understood that the barrier effect of the glass flakes against electric discharge streamer in the vertical direction is increased.

In particular, the flatness of the glass flakes prepared by the sol-gel processings is desirable in comparison with ones prepared by the conventional inflation processings, thereby the adhesion between the glass flakes when laminated is superior and occurrence of microscopic voids is limited. Therefore it is understood that the above excellent properties are realized.

DETAILED DESCRIPTION OF THE EMBODIMENTS

[Embodiment 1]

Si series glass flakes (SG glass flakes, product of Nihon Glass Plate Manufacturing Company, having a thickness of 0.5 μm and a diameter of 40–150 μm) prepared according to the sol-gel processings are dispersed in a solution (solution of methyl ethyl ketone/ethyl cellosolve) containing 2 wt % of phenoxy resin which functions as a binder, a film of the glass flakes is formed on a backing member of glass cloth (thickness of 35 μm) in the same manner as paper making, after removing the liquid the resultant sheet is dried for 5–10 minutes at 120° C. and dipped into and impregnated with a solution of methyl ethyl ketone/triol containing 20 wt % resin mixture of novolak type epoxy resin and bisphenol epoxy resin (1/1 mixture) blended with 3 wt % $BF_3$ complex functioning as a curing catalyst and heated for 10 minutes at 95° C. for rendering the resin into a semi-cured condition, thereby a glass flake prepreg having a thickness of 200 μm is obtained. It is observed that the resultant prepreg contains 53 wt % resin.

Two pieces of the glass flake prepregs are stacked, pressed, formed and cured for 1 hour at 160° C., thereby sheet (A) having a thickness of 260 μm is obtained.

For the purpose of comparison, sheet (B) having a thickness of 320 μm is prepared which is produced in the same manner as above from two pieces of prepregs (thickness of 260 μm) by making use of glass flakes (thickness of 5 μm and average diameter of 400 μm) prepared according to the conventional inflation processings.

Further, sheet (C) having a thickness of 200 μm is prepared which is produced in the same manner as above from one piece of a laminated mica prepreg of a thickness of 280 μm.

Figure 1:
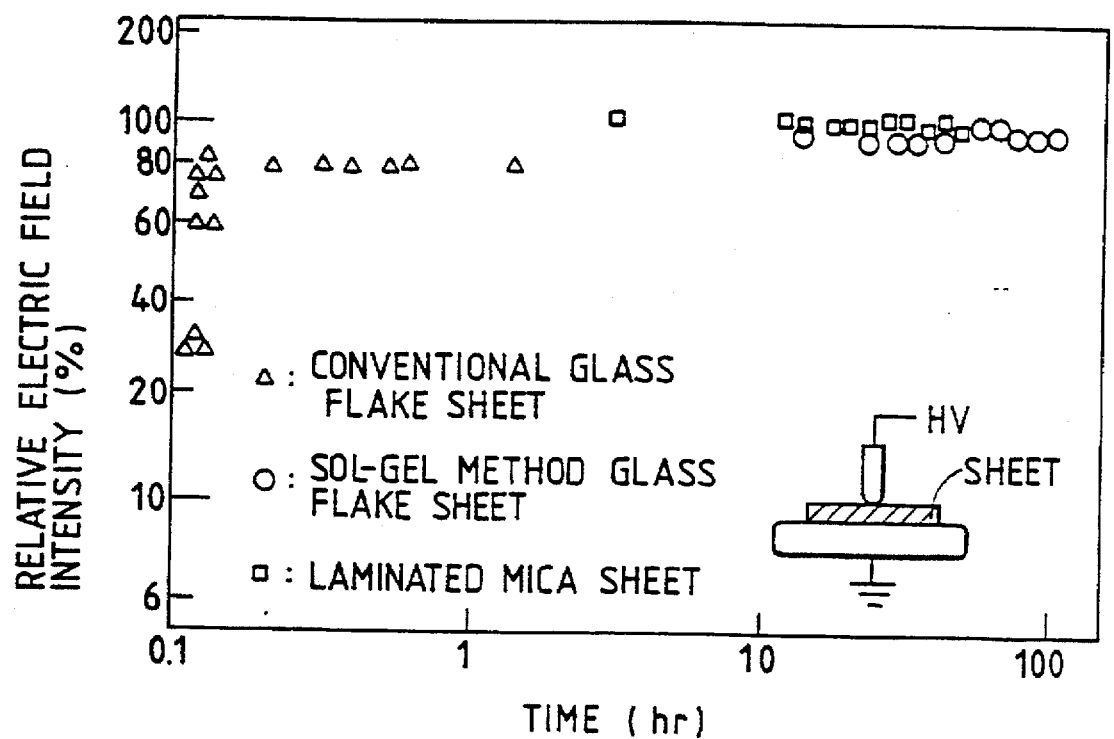
FIG. 1 is a graph illustrating V-t characteristics of electrical insulation sheets including one according to the present invention.

FIG. 1 shows the measurement results of V-t characteristic on the above respective sheets. As seen from FIG. 1 the glass flake sheet (A) according to the present invention exhibits an extremely superior V-t characteristic in comparison with the conventional glass flake sheet (B) and further exhibits a comparable characteristic with that of the laminated mica sheet (C).

[Embodiment 2]

Figure 2:
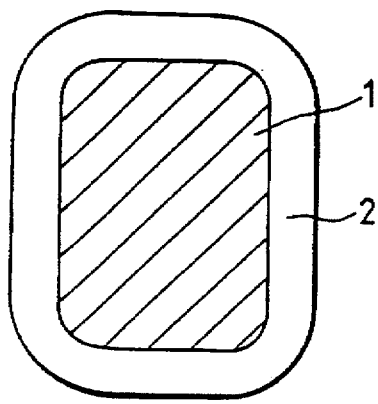
FIG. 2 is a schematic cross sectional view of an electrically insulated coil used in an embodiment according to the present invention.

In the present embodiment, electrically insulated coils as illustrated in a schematic cross sectional view in FIG. 2 are produced by making use of prepreg tapes prepared in the same manner as in the embodiment 1.

Figure 4:
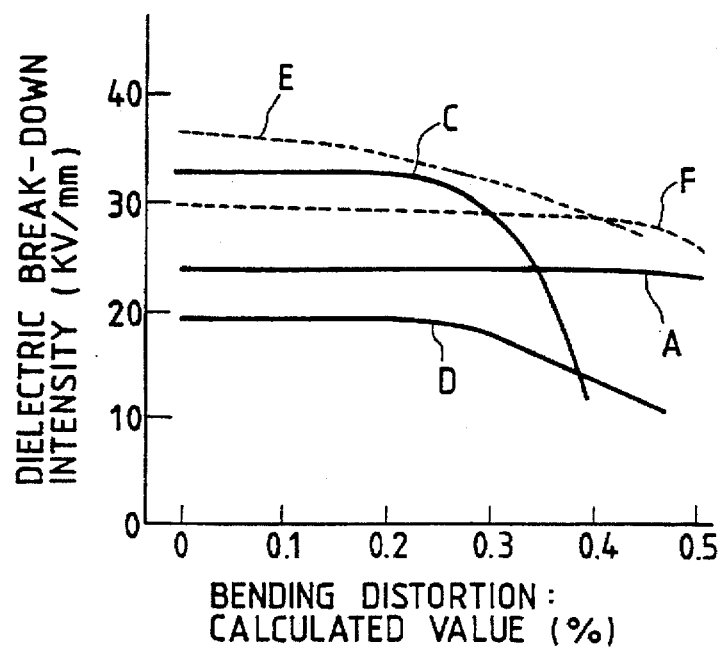
FIG. 4 is a view for comparing bending distortion-dielectric break down characteristics of electrically insulated coils including one according to the present invention.

The respective prepreg tapes are wound around respective coil conductors 1 by a predetermined number of times to constitute electrical insulation layers 2 respectively. Then the respective assemblies are placed in a metal mold, formed by pressing and heating and cured to produce respective electrically insulated coils. FIG. 4 shows a relationship between bending distortion and dielectric break down voltage of the thus produced respective electrically insulated coils.

With regard to the electrically insulated coil using the laminated mica tape (C), when the bending distortion exceeds 0.3%, the dielectric break down voltage suddenly decreases. On the other hand, with regard to the electrically insulated coil using the glass flake tape (A) according to the present invention no substantial decrease of the dielectric break down voltage was observed even when the bending distortion reaches up to 0.5%. Further, it was observed that the electrically insulated coil formed by the glass flake tape (A) according to the present invention also shows a superior characteristic to that formed by the flake mica tape (D).

Figure 5:
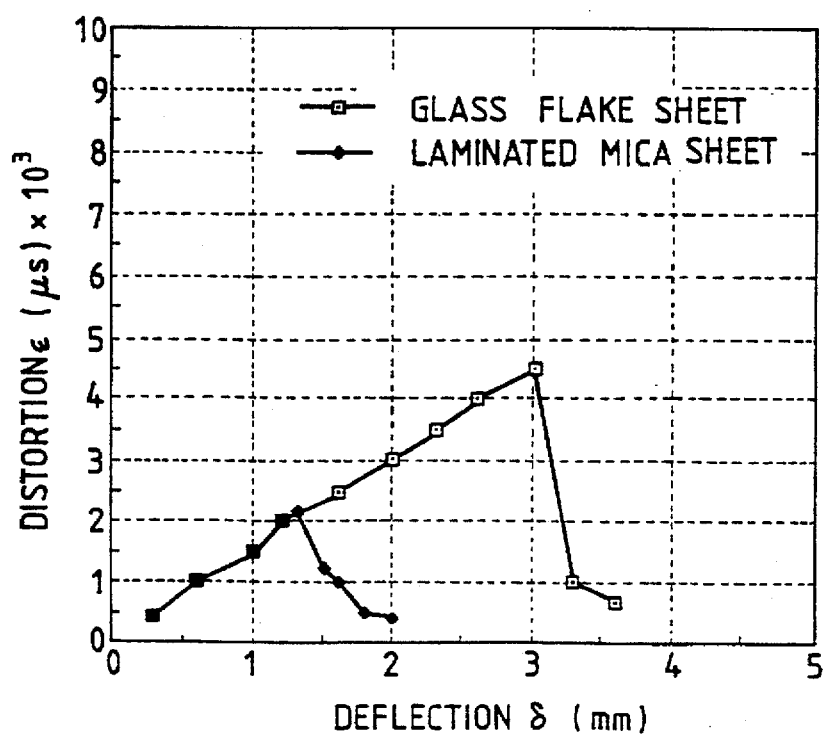
FIG. 5 is a graph illustrating bending distortion characteristics of electrically insulated model coils using the glass flakes according to the present invention and the laminated mica.

Further, in FIG. 5 bending distortion characteristics of the electrically insulated model coil using the glass flake tape (A) and the electrically insulated model coil using the laminated mica tape (C) are shown. As seen from the drawing it will be understood that the glass flake tape (A) exhibits a superior distortion characteristic to that of the laminated mica tape (C).

Figure 3:
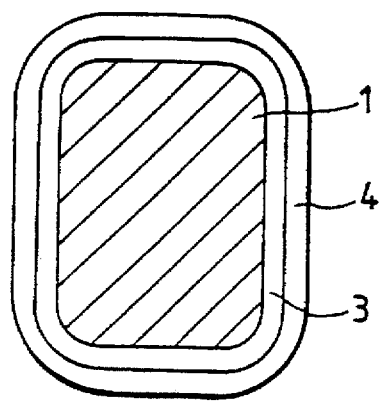
FIG. 3 is a schematic cross sectional view of another electrically insulated coil having two electrical insulation layers used in another embodiment.

Further, characteristics of electrically insulated coils having two-layered electrically insulated layers as illustrated in FIG. 3, namely using a combination (E) of laminated mica+flake mica and using another combination (F) of laminated mica+the glass flake according to the present invention, are also indicated in FIG. 4.

Further, in the electrically insulated coil as shown in FIG. 3, the laminated mica prepreg tape is used for the inner electrical insulation layer 3 and the respective prepreg tapes are used for the outer electrical insulation layer 4. In this instance too, it is determined that the electrically insulated coil formed by the glass flake prepreg tape according to the present invention exhibits an excellent characteristic and the reduction of the dielectric break down voltage is extremely limited upto a bending distortion of 0.5%.

According to the present embodiment, by forming the electrical insulation layer of the laminated mica having an excellent partial discharge resistance at the coil conductor side where the electrical field is concentrated and by forming thereover the electrical insulation layer of the glass flake according to the present invention having an excellent mechanical characteristic, an electrically insulated coil having an excellent partial discharge resistance as well as an excellent mechanical characteristic is obtained.

According to the above investigation results, it is understood that with the glass flake tape according to the present invention a partial discharge resistance like the laminated mica can be realized as well as a high dielectric break down voltage is maintained even at a bending distortion of 0.5%.

In the above embodiments, the electrically insulated coils are produced by making use of the respective prepreg tapes, however it is not necessary to use such prepreg tapes. For example, the electrically insulated coils can be produced by making use of dry tapes which have not been impregnated by a resin, in that after winding such dry tapes around the coil conductor the dry tapes can be impregnated by a proper resin. In particular, by impregnating the resin in a vacuum, voidless electrically insulated coils having a higher reliability are obtained.

Further, in the above embodiments, the glass flakes prepared by the sol-gel processings are used, however glass flakes prepared by the conventional method can be used if the thickness and the diameter thereof are controlled within the ranges according to the present invention. Nevertheless the glass flakes prepared by the sol-gel processings are still preferable.

Further, when glass flakes are used whose surfaces are treated by a coupling agent such as amino silane or an impregnation resin into which a coupling agant is mixed, the mechanical strength of the resultant sheet and the prepreg can be further increased.

[Embodiment 3]

Figure 6:
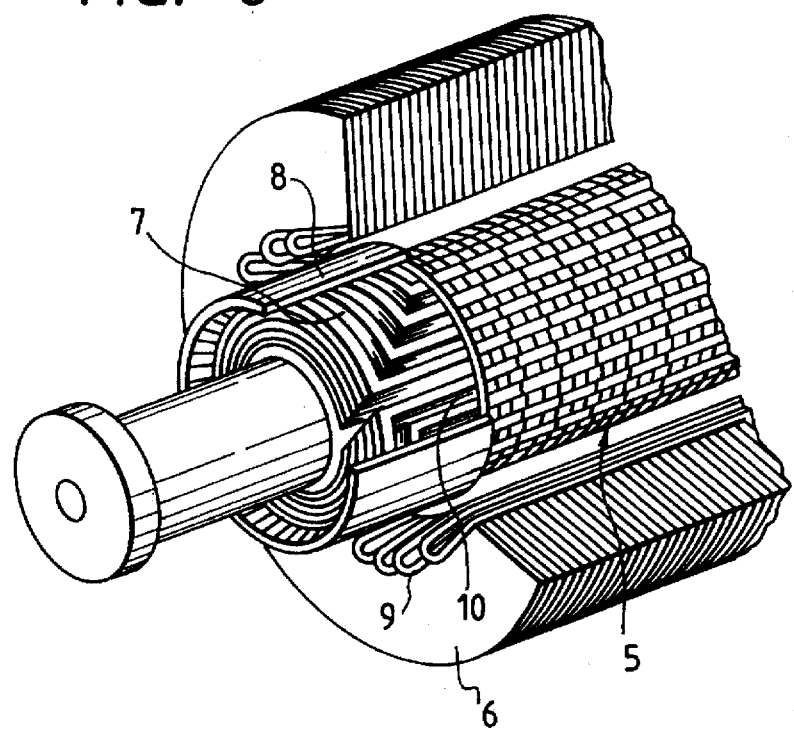
FIG. 6 is a schematic diagram of a rotor and a stator of a turbine generator.

FIG. 6 is a schematic diagram of a rotor and a stator of a turbine generator, wherein field windings 7 are disposed in a rotor core 10 of a rotor 5 and the ends of the field windings 7 are clamped by a retaining ring 8.

Further, stator windings 9 are disposed in a stator core 6 located outside the rotor 5. The field windings 7 are subjected to stresses due to centrifugal force. When the generator frequently repeats starting and stopping, the field windings 7 as well as the stator windings 9 are frequently subjected to such stresses.

When the glass flake electrical insulation tapes according to the present invention are applied to the electrical insulation layers for the field windings 7 and the stator windings 9, electrically insulated coils having an excellent dielectric resistance as well as a high mechanical strength are obtained, thereby a highly reliable dynamoelectric machine can be provided.

Figure 7:
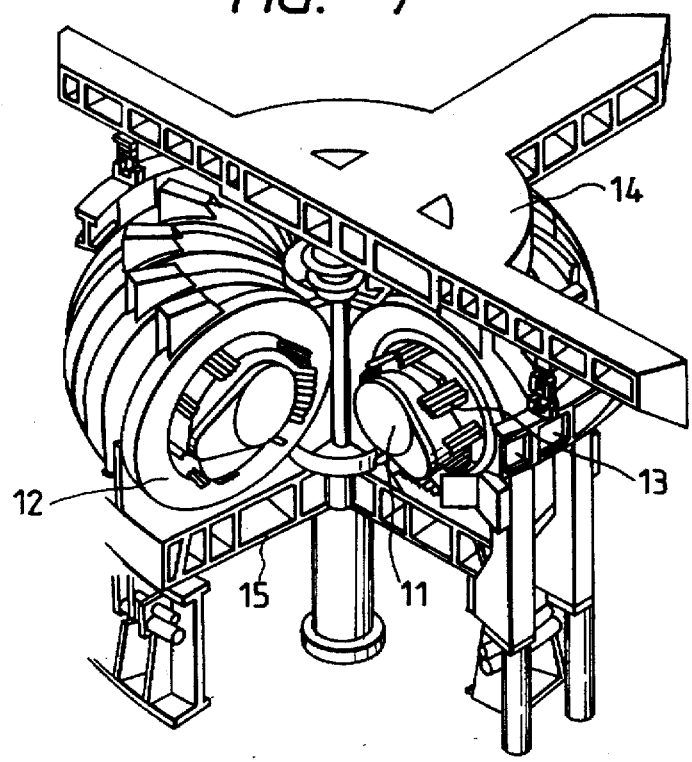
FIG. 7 is a schematic diagram of a tokamak type nuclear fusion device.

FIG. 7 is a schematic diagram of a tokamak type nuclear fusion device wherein along the circumference of a vacuum vessel 11 for confining plasma supported by an upper supporting stand 14 and a lower supporting stand 15, poloidal magnetic field coils 13 and toroidal magnetic field coils 12 are disposed so as to perpendicularly cross each other for generating a magnetic field which holds the plasma at the center of the cylindrical vacuum vessel 11.

The magnetic field is generated by flowing a large current through the respective coils 12 and 13. Accordingly large stresses act on the respective coils.

When the glass flake electrical insulation tapes according to the present invention are applied to the electrical insulation layers for the poloidal magnetic field coils 13 and the toroidal magnetic field coils 12 which can withstand such stresses, electrically insulated coils having an excellent dielectric resistance as well as a high mechanical strength are obtained, thereby a highly reliable nuclear fusion device can be provided.

According to the present invention, an electrically insulated coil having an excellent partial discharge resistance as well as having a high dielectric break down strength even when subjected to a large mechanical distortion is provided which is suitable for an electrically insulated coil for an electrical machine which is used in a severe operating condition subjected to a large stress under a higher electrical field intensity.

We claim:

1. An electrically insulated coil, comprising:
   an electrical insulation layer wound around an electrical conductor, said electrical insulation layer being formed by laminating layers of glass flakes having a thickness of 0.2–1 μm and a diameter of 40–250 μm on a backing member of a sheet of electrical insulation material, and by impregnating the laminated layers with a semi-cured thermosetting resin.

2. An electrically insulated coil according to claim 1, wherein said glass flakes are made by a sol-gel process.

3. An electrically insulated coil according to claim 1, wherein said electrical insulation material is a glass fabric.

4. An electrically insulated coil according to claim 2, wherein said electrical insulation material is a glass fabric.

5. An electrically insulated coil, comprising:
   an electrical conductor; and
   an electrical insulation layer wound around the electrical conductor;
   wherein said electrical insulation layer includes a backing sheet of an electrical insulation material, and plural laminated glass flake sublayers on the backing sheet, the glass flakes having a thickness of 0.2–1 μm and a diameter of 40–250 μm, and the laminated layers being impregnated with a semi-cured thermosetting resin.

6. An electrically insulated coil according to claim 5, wherein said glass flakes are made by a sol-gel process.

7. An electrically insulated coil according to claim 5, wherein said electrical insulation material is a glass fabric.

8. An electrically insulated coil according to claim 6, wherein said electrical insulation material is a glass fabric.

* * * * *